US011367432B2

(12) United States Patent
Peyser et al.

(10) Patent No.: US 11,367,432 B2
(45) Date of Patent: Jun. 21, 2022

(54) END-TO-END AUTOMATED SPEECH RECOGNITION ON NUMERIC SEQUENCES

(71) Applicant: Google LLC, Mountain View, CA (US)

(72) Inventors: Charles Caleb Peyser, New York, NY (US); Hao Zhang, Jericho, NY (US); Tara N. Sainath, Jersey City, NJ (US); Zelin Wu, Jersey City, NJ (US)

(73) Assignee: Google LLC, Mountain View, CA (US)

( * ) Notice: Subject to any disclaimer, the term of this patent is extended or adjusted under 35 U.S.C. 154(b) by 161 days.

(21) Appl. No.: 16/830,996

(22) Filed: Mar. 26, 2020

(65) Prior Publication Data

US 2020/0349922 A1  Nov. 5, 2020

Related U.S. Application Data

(60) Provisional application No. 62/842,566, filed on May 3, 2019.

(51) Int. Cl.
*G10L 15/22* (2006.01)
*G10L 15/26* (2006.01)
*G10L 15/06* (2013.01)
*G06N 3/08* (2006.01)
*G10L 13/00* (2006.01)
(Continued)

(52) U.S. Cl.
CPC .............. *G10L 15/063* (2013.01); *G06N 3/08* (2013.01); *G10L 13/00* (2013.01); *G10L 15/16* (2013.01); *G10L 15/197* (2013.01); *G10L 15/22* (2013.01)

(58) Field of Classification Search
CPC .......... G10L 15/16; G10L 15/22; G10L 15/26
See application file for complete search history.

(56) References Cited

U.S. PATENT DOCUMENTS

| 6,078,887 A * | 6/2000 | Gamm | G10L 15/22 |
| | | | 704/275 |
| 2017/0148431 A1* | 5/2017 | Catanzaro | G10L 25/18 |

OTHER PUBLICATIONS

He, Yanzhang, et al. "Streaming End-to-end Speech Recognition For Mobile Devices." arXiv preprint arXiv:1811.06621 (2018). (Year: 2018).*

(Continued)

*Primary Examiner* — Jialong He
(74) *Attorney, Agent, or Firm* — Honigman LLP; Brett A. Krueger; Grant Griffith

(57) ABSTRACT

A method for generating final transcriptions representing numerical sequences of utterances in a written domain includes receiving audio data for an utterance containing a numeric sequence, and decoding, using a sequence-to-sequence speech recognition model, the audio data for the utterance to generate, as output from the sequence-to-sequence speech recognition model, an intermediate transcription of the utterance. The method also includes processing, using a neural corrector/denormer, the intermediate transcription to generate a final transcription that represents the numeric sequence of the utterance in a written domain. The neural corrector/denormer is trained on a set of training samples, where each training sample includes a speech recognition hypothesis for a training utterance and a ground-truth transcription of the training utterance. The ground-truth transcription of the training utterance is in the written domain. The method also includes providing the final transcription representing the numeric sequence of the utterance in the written domain for output.

26 Claims, 6 Drawing Sheets

(51) Int. Cl.
　　　*G10L 15/16*　　　(2006.01)
　　　*G10L 15/197*　　(2013.01)

(56) References Cited

OTHER PUBLICATIONS

Zhang, Hao, et al. "Neural models of text normalization for speech applications." Computational Linguistics 45.2 (2019): 293-337, available from ResearchGate website in Mar. 2019. (Year: 2019).*
Pusateri, Ernest, et al. "A Mostly Data-Driven Approach to Inverse Text Normalization." INTERSPEECH. 2017. (Year: 2017).*
Zhang, Hao, et al. "Neural models of text normalization for speech applications." Computational Linguistics 45.2 (2019): 293-337. (Year: 2019).*
Sproat, Richard, and Navdeep Jaitly. "An RNN Model of Text Normalization." INTERSPEECH. 2017. (Year: 2017).*
Gorman, Kyle, and Richard Sproat. "Minimally supervised number normalization." Transactions of the Association for Computational Linguistics 4 (2016): 507-519. (Year: 2016).*
Sak, Haşim, et al. "Language model verbalization for automatic speech recognition." 2013 IEEE International Conference on Acoustics, Speech and Signal Processing. IEEE, 2013. (Year: 2013).*

* cited by examiner

END-TO-END AUTOMATED SPEECH RECOGNITION ON NUMERIC SEQUENCES

CROSS REFERENCE TO RELATED APPLICATIONS

This U.S. patent application claims priority under 35 U.S.C. § 119(e) to U.S. Provisional Application 62/842,566, filed on May 3, 2019. The disclosure of this prior application is considered part of the disclosure of this application and is hereby incorporated by reference in its entirety.

TECHNICAL FIELD

An ongoing challenge in automated speech recognition (ASR) systems is to model transcriptions that do not exactly reflect the words spoken in an utterance. Particularly, numeric utterances, such as addresses, phone numbers, and postal codes are particularly hard members for modeling transcriptions due to the inherent out-of-vocabulary issues of long written-domain numeric sequences. This is a result of data sparsity since long numeric sequences are unlikely to be present in training data.

Sufficient amounts of training data are difficult to obtain for long numeric sequences because, for example, a number with ten digits as $10^{10}$ possible instances. For a ten digit phone number, for example, it is unlikely that any particular phone number is seen at all, or in sufficient quantities, in training.

Recently, streaming, recurrent neural network transducer (RNN-T), end-to-end (E2E) models have shown great promise for on-device speech recognition, exhibiting improved word error rate (WER) and latency metrics as compared to conventional on-device models. These models, which fold the AM, PM, and LM into a single network, have shown competitive results compared to conventional ASR systems which have a separate AM, PM, and LMs. RNN-T, E2E models are particularly attractive for on-device ASR, as they can outperform on-device conventional models of comparable size

SUMMARY

Although recurrent neural network-transducer (RNN-T), end-to-end (E2E) models are attractive for on-device ASR, the large memory footprint of a weighted-finite state transducer (WFST)-based verbalizer makes spoken domain training more difficult in the on-device environment. To improve end-to-endE2E model performance on utterances with numeric sequences, the enhanced ASR system described by this specification uses additional numeric training data that is generated by a text-to-speech (TTS) system, and then uses a small-footprint neural network instead of an FST to perform denorming or correction. Such an enhanced approach yields measurable improvement in several categories of numeric sequences, and exhibits significant improvement in word error rate (WER) for longer numeric sequences.

One aspect of the disclosure provides a method for generating final transcriptions that represent numeric sequences of utterances in a written domain. The method includes receiving, at data processing hardware, audio data for an utterance containing a numeric sequence, and decoding, by the data processing hardware, using a sequence-to-sequence speech recognition model, the audio data for the utterance to generate, as output from the sequence-to-sequence speech recognition model, an intermediate transcription of the utterance. The method also includes processing, by the data processing hardware, using a neural corrector/denormer, the intermediate transcription output from the sequence-to-sequence speech recognition model to generate a final transcription that represents the numeric sequence of the utterance in a written domain. The neural corrector/denormer is trained on a set of training samples, where each training sample includes a speech recognition hypothesis for a corresponding training utterance and a ground-truth transcription of the corresponding training utterance. The ground-truth transcription of the corresponding training utterance is in the written domain. The method also includes providing, by the data processing hardware, the final transcription representing the numeric sequence of the utterance in the written domain for output.

Implementations of the disclosure may include one or more of the following optional features. In some implementations, the intermediate transcription output from the sequence-to-sequence speech recognition model is in a spoken domain, and the speech recognition hypothesis of each training sample in the set of training samples used to train the neural corrector/denormer is in the spoken domain. In these implementations, processing the intermediate transcription may include using the neural corrector/denormer as a written domain denorming model configured to: receive, as input, the intermediate transcription output from the sequence-to-sequence speech recognition model in the spoken domain; and generate, as output, the final transcription of the utterance in the written domain. Here, the final transcription of the utterance in the written domain represents the sequence of numbers as a corresponding numerical representation.

In other implementations, the intermediate transcription output from the sequence-to-sequence speech recognition model is in the written domain and represents the sequence of numbers as numerical words, and the speech recognition hypothesis of each training example in the set of training samples used to train the neural corrector/denormer is in the written domain. In these implementations, processing the intermediate transcription may include using the neural corrector/denormer as a written domain correction model configured to: receive, as input, the intermediate transcription output from the sequence-to-sequence speech recognition model in the written domain; and generate, as output, the final transcription as a corrected transcription that replaces the numerical words in the initial transcription with a corresponding numerical representation of the sequence of numbers in the written domain. In some examples, the written domain correction model is configured to generate, as output, the final transcription as the corrected transcription by only processing a first portion of the intermediate transcription that includes the numerical words without processing a remaining second portion of the intermediate transcription that includes non-numerical words. Here, the written domain correction model may be configured to copy over the non-numerical words from the intermediate transcription into the corrected transcription.

In some examples, the data processing hardware or a remote computing device in communication with the data processing hardware is configured to train the sequence-to-sequence speech recognition model and the neural corrector/denormer by: obtaining a plurality of training utterance sets that are each associated with a different respective numeric category and include a plurality of respective transcript templates, whereby each transcript template includes a respective default phrase in the written domain and a numeric slot. For each transcript template, the data processing hardware or the remote computing device further generates one or more synthetic speech representations of numeric values, and for each of the one or more synthetic speech representations of numeric values generated, injecting the corresponding synthetic speech representation of numeric values into the slot of the corresponding transcript template to generate a unique training utterance that includes an audible representation of the default phrase for the corresponding transcript template and the corresponding synthetic speech representation of numerical values. Lastly, the data processing hardware or the remote computing device trains the sequence-to-sequence speech recognition model on the unique training utterances generated for each of the one or more synthetic speech representations of numeric values generated for each of the plurality of transcript templates of each training utterance set. In these examples, the audible representation of the default phrase corresponding to at least one of the transcript templates may include anonymized non-synthetic speech or a synthesized speech representation of the default phrase. Additionally or alternatively, a written domain transcription of the unique training utterance may include the ground-truth transcription of a respective one of the training samples in the set of training samples used to train the neural corrector/denormer.

In some implementations, the sequence-to-sequence speech recognition model includes a recurrent neural network-transducer (RNN-T), end-to-end decoder model. The neural corrector/denormer may include and encoder portion, a tagger portion, and an attention/decoder portion. The encoder portion is configured to generate an encoded representation of the intermediate transcription output from the sequence-to-sequence speech recognition model. The tagger portion is configured to tag each non-numerical word in the intermediate transcription as trivial and each numerical word in the intermediate transcription as non-trivial. The attention/decoder portion is configured process non-trivial tags from the tagger portion to obtain a numeric representation for the numeric sequence of the utterance in the written domain. In these implementations, the encoder portion may include a bi-directional recurrent neural network (BiRNN), the tagger portion may include a recurrent neural network (RNN), and the attention/decoder portion may include a BiRNN.

Another aspect of the disclosure provides a system for generating final transcriptions that represent numerical sequences in a written domain. The system includes data processing hardware and memory hardware in communication with the data processing. The memory hardware stores instructions that when executed on the data processing hardware cause the data processing hardware to perform operations that include receiving audio data for an utterance containing a numeric sequence, and decoding, using a sequence-to-sequence speech recognition model, the audio data for the utterance to generate, as output from the sequence-to-sequence speech recognition model, an intermediate transcription of the utterance. The operations also include processing, using a neural corrector/denormer, the intermediate transcription output from the sequence-to-sequence speech recognition model to generate a final transcription that represents the numeric sequence of the utterance in a written domain. The neural corrector/denormer is trained on a set of training samples, where each training sample includes a speech recognition hypothesis for a corresponding training utterance and a ground-truth transcription of the corresponding training utterance. The ground-truth transcription of the corresponding training utterance is in the written domain. The operations also include providing the final transcription representing the numeric sequence of the utterance in the written domain for output.

This aspect may include one or more of the following optional features. In some implementations, the intermediate transcription output from the sequence-to-sequence speech recognition model is in a spoken domain, and the speech recognition hypothesis of each training sample in the set of training samples used to train the neural corrector/denormer is in the spoken domain. In these implementations, processing the intermediate transcription may include using the neural corrector/denormer as a written domain denorming model configured to: receive, as input, the intermediate transcription output from the sequence-to-sequence speech recognition model in the spoken domain; and generate, as output, the final transcription of the utterance in the written domain. Here, the final transcription of the utterance in the written domain represents the sequence of numbers as a corresponding numerical representation.

In other implementations, the intermediate transcription output from the sequence-to-sequence speech recognition model is in the written domain and represents the sequence of numbers as numerical words, and the speech recognition hypothesis of each training example in the set of training samples used to train the neural corrector/denormer is in the written domain. In these implementations, processing the intermediate transcription may include using the neural corrector/denormer as a written domain correction model configured to: receive, as input, the intermediate transcription output from the sequence-to-sequence speech recognition model in the written domain; and generate, as output, the final transcription as a corrected transcription that replaces the numerical words in the initial transcription with a corresponding numerical representation of the sequence of numbers in the written domain. In some examples, the written domain correction model is configured to generate, as output, the final transcription as the corrected transcription by only processing a first portion of the intermediate transcription that includes the numerical words without processing a remaining second portion of the intermediate transcription that includes non-numerical words. Here, the written domain correction model may be configured to copy over the non-numerical words from the intermediate transcription into the corrected transcription.

In some examples, the data processing hardware or a remote computing device in communication with the data processing hardware is configured to train the sequence-to-sequence speech recognition model and the neural corrector/denormer by: obtaining a plurality of training utterance sets that are each associated with a different respective numeric category and include a plurality of respective transcript templates, whereby each transcript template includes a respective default phrase in the written domain and a numeric slot. For each transcript template, the data processing hardware or the remote computing device further generates one or more synthetic speech representations of numeric values, and for each of the one or more synthetic speech representations of numeric values generated, injecting the corresponding synthetic speech representation of numeric values into the slot of the corresponding transcript template to generate a unique training utterance that includes an audible representation of the default phrase for the corresponding transcript template and the corresponding synthetic speech representation of numerical values. Lastly, the data processing hardware or the remote computing device trains the sequence-to-sequence speech recognition model on the unique training utterances generated for each of the one or more synthetic speech representations of numeric values generated for each of the plurality of transcript templates of each training utterance set. In these examples, the audible representation of the default phrase corresponding to at least one of the transcript templates may include anonymized non-synthetic speech or a synthesized speech representation of the default phrase. Additionally or alternatively, a written domain transcription of the unique training utterance may include the ground-truth transcription of a respective one of the training samples in the set of training samples used to train the neural corrector/denormer.

In some implementations, the sequence-to-sequence speech recognition model includes a recurrent neural network-transducer (RNN-T), end-to-end decoder model. The neural corrector/denormer may include and encoder portion, a tagger portion, and an attention/decoder portion. The encoder portion is configured to generate an encoded representation of the intermediate transcription output from the sequence-to-sequence speech recognition model. The tagger portion is configured to tag each non-numerical word in the intermediate transcription as trivial and each numerical word in the intermediate transcription as non-trivial. The attention/decoder portion is configured process non-trivial tags from the tagger portion to obtain a numeric representation for the numeric sequence of the utterance in the written domain. In these implementations, the encoder portion may include a bi-directional recurrent neural network (BiRNN), the tagger portion may include a recurrent neural network (RNN), and the attention/decoder portion may include a BiRNN.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

When a user speaks the sequence of words "My phone number is 650-555-1212," an ASR system can output a transcription of that spoken, numeric sequence in the so-called "spoken domain," i.e., as those words are actually spoken ("My Phone Number is Six Five Oh Five Five Five One Two One Two"), or in the so-called "written domain," i.e., as those words would likely be reproduced in writing ("My phone number is 650-555-1212"). Sometimes, the ASR system can output the transcription of the numeric sequence in the written domain, but the transcription can represent the numeric sequence as numerical words (e.g., "Six Five Zero Five Five Five One Two One Two") rather than as a corresponding numerical representation (e.g., "650-555-1212") as intended. Other numeric sequences, such as those that are included in addresses, phone numbers and postal codes, often have different spoken domain and written domain transcriptions.

It can be challenging for ASR systems to appropriately transcribe utterances with numeric sequences, particularly when the same numeric sequences are not seen during training, due to the inherent out-of-vocabulary ("OOV") issues of long written domain numeric sequences. This challenge arises because of data sparsity issues, namely the lack of sufficient long numeric sequences in training data.

Sufficient amounts of training data are difficult to obtain for long numeric sequences because, for example, a number with ten digits as $10^{10}$ possible instances. For a ten digit phone number, for example, it is unlikely that any particular phone number is seen at all, or in sufficient quantities, in training.

The OOV issue is addressed in conventional ASR systems by training its acoustic model (AM) and/or its pronunciation model (PM) on spoken domain utterances for which numeric sequences are composed of in-vocabulary, spelled-out numbers (e.g., numerical words), then by inserting a weighted finite state transducer (WFST) verbalizer before a class-based language model (LM) to correct (or "denormalize" or "denorm") the spoken domain result into the written domain. Unfortunately, conventional ASR models and WFST verbalizers are not suitable for the low memory constraints of on-device ASR. Furthermore, due to the fact that the verbalizer and class-based LM use a predefined set of rules, these components do not scale well to changes in training data.

Recently, streaming, recurrent neural network transducer (RNN-T), end-to-end (E2E) models have shown great promise for on-device speech recognition, exhibiting improved word error rate (WER) and latency metrics as compared to conventional on-device models. These models, which fold the AM, and LM into a single network, have shown competitive results compared to conventional ASR systems which have a separate AM, PM, and LMs. RNN-T, E2E models are particularly attractive for on-device ASR, as they can outperform on-device conventional models of comparable size.

Figure 1:
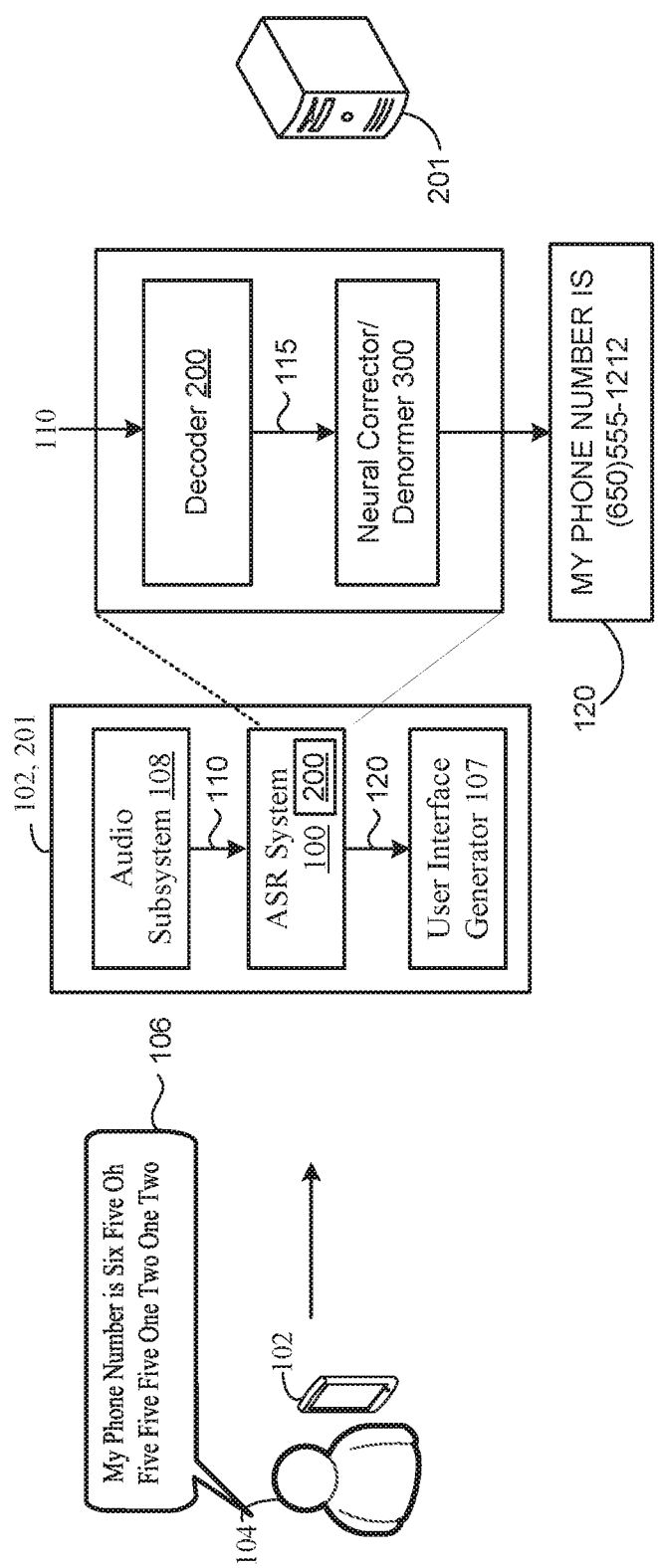
FIG. 1 is a schematic view of a speech recognition system including a neural corrector/denormer for enhancing recognition of numerical sequences.

Referring to FIG. 1, in some implementations, an automated speech recognition (ASR) system 100 is enhanced to recognize numeric sequences. In the example shown, the ASR system 100 resides on a user device 102 of a user 104 and/or on a remote computing device 201 (e.g., one or more serves of a distributed system executing in a cloud-computing environment) in communication with the user device. Although the user device 102 is depicted as a mobile computing device (e.g., a smart phone), the user device 102 may correspond to any type of computing device such as, without limitation, a tablet device, a laptop/desktop computer, a wearable device, a digital assistant device, a smart speaker/display, a smart appliance, an automotive infotainment system, or an Internet-of-Things (IoT) device.

The user device 102 includes an audio subsystem 108 configured to receive an utterance 106 spoken by the user 104 (e.g., the user device 102 may include one or more microphones for recording the spoken utterance 106) and convert the utterance 106 into a corresponding digital format associated with parameterized input acoustic frames 110 capable of being processed by the ASR system 100. In the example shown, the user speaks a respective utterance 106 for the phrase that would be transcribed in a spoken domain as "My Phone Number is Six Five Oh Five Five Five One Two One Two" and the audio subsystem 108 converts the utterance 106 into corresponding acoustic frames 110 for input to the ASR system 100. For instance, the acoustic frames 110 may be a series of parameterized input acoustic frames that each include 80-dimensional log-Mel features, computed with a short, e.g., 25 ms, window and shifted every few, e.g., 10, milliseconds.

Thereafter, the ASR system 100 receives, as input, the acoustic frames 110 corresponding to the utterance 106, and generates/predicts, as output, a corresponding transcription (e.g., recognition result/hypothesis) 120 for the utterance 106 in the written domain, i.e., the text "My phone number is (650) 555-1212". In the example shown, the user device 102 and/or the remote computing device 201 also executes a user interface generator 107 configured to present a representation of the transcription 120 of the utterance 106 to the user 104 of the user device 102.

In some configurations, the transcription 120 output from the ASR system 100 is processed, e.g., by a natural language understanding (NLU) module executing on the user device 102 or the remote computing device 201, to execute a user command. Additionally or alternatively, a text-to-speech system (e.g., executing on any combination of the user device 104 or the remote computing device 201) may convert the transcription into synthesized speech for audible output by another device. For instance, the original utterance 106 may correspond to a message the user 104 is sending to a friend in which the transcription 120 is converted to synthesized speech for audible output to the friend to listen to the message conveyed in the original utterance 106.

Notably, the enhanced ASR system 100 includes a decoder 200 and a neural corrector/denormer 300. The decoder 200 is configured to receive, as input, the parameterized input acoustic frames 110, and generate, as output, an intermediate transcription 115 that represents the utterance 105 in the spoken domain or the written domain. The neural corrector/denormer 300 is configured to receive the intermediate transcription 115 output from the decoder 200 and perform one of written domain-to-written domain correction or spoken domain-to-written domain denorming. For instance, when the intermediate transcription 115 is in the spoken domain and the neural corrector/denormer 300 is configured as a neural denormer, the neural corrector/denormer 300 is configured to receive, as input, the intermediate transcription 115 in the spoken domain, and generate, as output, the transcription 120 for the utterance 106 in the written domain, i.e., the text "My phone number is (650) 555-1212". On the other hand, when the intermediate transcription 115 is in the written domain and the neural corrector/denormer 300 is configured as a neural corrector, the neural corrector/denormer 300 is configured to receive, as input, the intermediate transcription 115 in the written domain, and generate, as output, the transcription 120 as a "corrected" written domain transcription for the utterance 106. Here, the intermediate transcription 115 in the written domain may represent the numeric sequence as numerical words such that the numeric sequence is spelled out as "Six Five Zero Five Five Five One Two One Two", whereby the neural corrector 300 generates the "corrected" transcription 120 in the written domain such that a corresponding numerical representation of "650-555-1212" replaces the spelled out, in vocabulary numerical word representation from the intermediate transcription 115 output from the decoder 200.

In some implementations, the enhanced ASR system 100 is trained on additional numeric training data 416 (FIG. 4) generated by a text-to-speech (TTS) system 412 (FIG. 4), and uses the neural corrector/denormer 300 to in lieu of a FST-based verbalizer to improve E2E model performance on training utterances 402 (FIG. 4) having numeric sequences. Such an enhanced approach yields measurable improvement in several categories of numeric sequences, and exhibits significant improvement in WER for longer numeric sequences. The neural corrector/denormer 300 includes a small-footprint neural network to enable the neural corrector/denormer 300 suitable for use in an on-device environment (e.g., locally on the user device 102) to perform correction or denorming on intermediate transcriptions 115 output from the decoder 200. The large footprint associated with FST-based verbalizers prohibits their use in the on-device ASR environment due to the low memory constrains. Additionally, FST-based verbalizers use a pre-defined set of rules that do not scale well to changes in training data.

Figure 2:
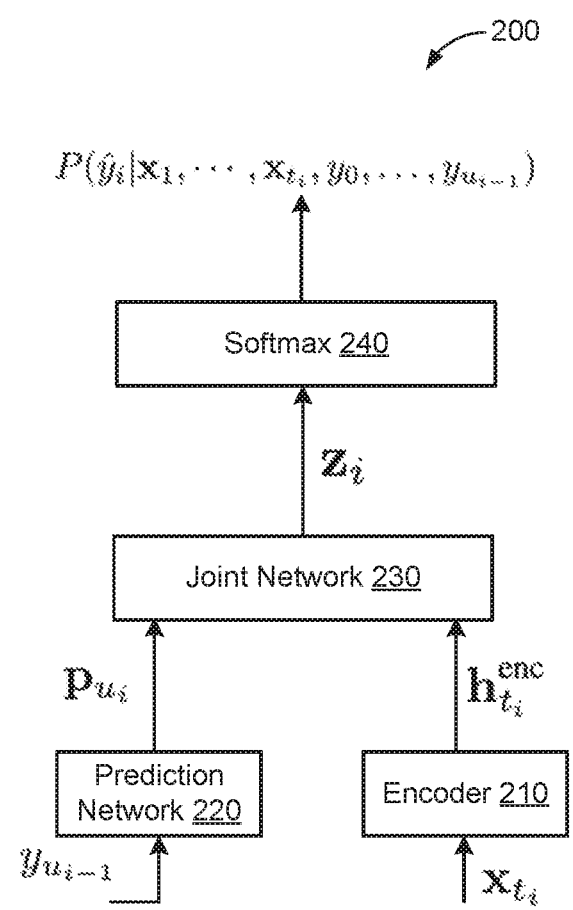
FIG. 2 is a schematic view of a recurrent neural network-transducer (RNN-T) model architecture.

With reference to FIG. 2, the decoder 200 may include an E2E, RNN-T model 200 which adheres to latency constrains associated with interactive applications. The RNN-T model 200 provides a small computational footprint and utilizes less memory requirements than conventional ASR architectures, making the RNN-T model architecture suitable for performing speech recognition entirely on the user device 102 (e.g., no communication with a remote server is required). The RNN-T model 200 includes an encoder network 210, a prediction network 220, and a joint network 230. The encoder network 210, which is roughly analogous to an acoustic model (AM) in a traditional ASR system, includes a recurrent network of stacked Long Short-Term Memory (LSTM) layers. For instance the encoder reads a sequence of d-dimensional feature vectors (e.g., acoustic frames 110 (FIG. 1)) $x=(x_1, x_2, \ldots, x_T)$, where $x_t \in \mathbb{R}_d$, and produces at each time step a higher-order feature representation. This higher-order feature representation is denoted as $h_1^{ene}, \ldots, h_T^{ene}$.

Similarly, the prediction network 220 is also an LSTM network, which, like a language model (LM), processes the sequence of non-blank symbols output by a final Softmax layer 240 so far, $y_0, \ldots, y_{ui-1}$, into a dense representation $D_v$. Finally, with the RNN-T model architecture, the representations produced by the encoder and prediction networks 210, 220 are combined by the joint network 230. The joint network then predicts P $P(y_i|x_1, \ldots, x_{t_i}, y_0, \ldots, y_{u_{i-1}})$ which is a distribution over the next output symbol. Stated differently, the joint network 230 generates, at each output step (e.g., time step), a probability distribution over possible speech recognition hypotheses. Here, the "possible speech recognition hypotheses" correspond to a set of output labels each representing a symbol/character in a specified natural language. Accordingly, the joint network 230 may output a set of values indicative of the likelihood of occurrence of each of a predetermined set of output labels. This set of values can be a vector and can indicate a probability distribution over the set of output labels. In some cases, the output labels are graphemes (e.g., individual characters, and potentially punctuation and other symbols), but the set of output labels is not so limited. The output distribution of the joint network 230 can include a posterior probability value for each of the different output labels. Thus, if there are 100 different output labels representing different graphemes or other symbols, the output $y_1$ of the joint network 230 can include 100 different probability values, one for each output label. The probability distribution can then be used to select and assign scores to candidate orthgraphic elements (e.g., graphemes, wordpieces, and/or words) in a beam search process (e.g., by the Softmax layer 240) for determining the intermediate transcription115.

The Softmax layer 240 may employ any technique to select the output label/symbol with the highest probability in the distribution as the next output symbol predicted by the model 200 at the corresponding output step. In this manner, the RNN-T model 200 does not make a conditional independence assumption, rather the prediction of each symbol is conditioned not only on the acoustics but also on the sequence of labels output so far. The RNN-T model 200 does assume an output symbol is independent of future acoustic frames 110, which allows the RNN-T model to be employed in a streaming fashion.

In some examples, the encoder network 210 of the RNN-T model 200 is made up of eight 2,048-dimensional LSTM layers, each followed by a 640-dimensional projection layer. A time-reduction layer with the reduction factor of two may be inserted after the second LSTM layer of the encoder to reduce model latency. The prediction network 220 may have two 2,048-dimensional LSTM layers, each of which is also followed by 640-dimensional projection layer. Finally, the joint network 230 may also have 640 hidden units, followed by a 4,096 wordpiece softmax output.

Figure 3:
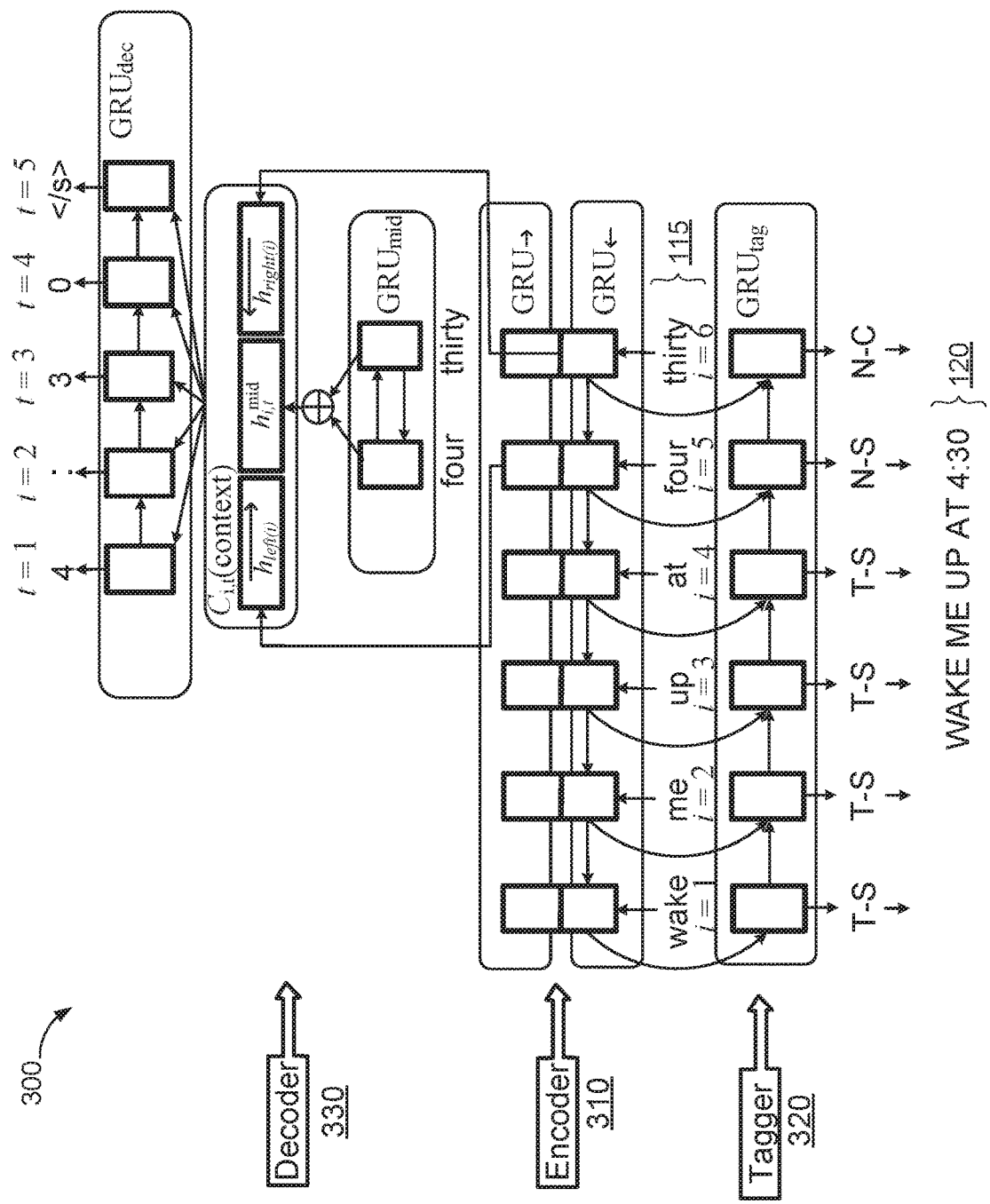
FIG. 3 is a schematic view of the neural corrector/denormer correcting a written-domain transcription output from a speech recognition model.

FIG. 3 shows an example architecture for the neural corrector/denormer 300 of the enhanced ASR system 100 of FIG. 1 for performing neural correction or neural denorming as a post-processing operation on outputs received from the RNN-T, E2E decoder 200 of the enhanced ASR system 100. The architecture for the neural corrector/denormer 300 includes an encoder portion 310, a tagger portion 320, and an attention/decoder portion 330. In some examples, the encoder portion 310 is a bidirectional RNN (BiRNN) that includes a bidirectional single-layer Gated Recurrent Unit (GRU) encoder 310 having 256 units that emits a 256-dimensional hidden state. The tagger portion 320 may be a RNN including a single-layer GRU with 64 units and the attention/decoder portion 330 may be a bidirectional single-layer GRU with 256 units. Although FIG. 2 describes the neural corrector/denormer 300 primary in terms of neural correction, the neural corrector/denormer 300 may be additionally or alternatively used for neural denorming. In the example shown, "T" stands for trivial, "N" stands for non-trivial, "S" stands for start, and "C" stands for continuation.

When implemented as the neural corrector, the neural corrector/denormer 300 corresponds a written domain correction model 300 that receives, as input, a written-domain, intermediate transcription 115 generated by the RNN-T, E2E decoder 200, and generates, as output, a corrected, written domain transcription 120 (e.g., a final transcription 120). When implemented as a neural denormer, the neural corrector/denormer 300 corresponds to a written domain denorming model 300 that receives, as input, a spoken domain, intermediate transcription 115 generated by the RNN-T, E2E decoder 200, and generates, as output, a written domain transcription 120 (e.g., a final transcription 120). Thus, whether implemented as the neural corrector or denormer, the architecture of the neural corrector/denormer 300 provides an attention-based, sequence-to-sequence model that receives the output from another sequence-to-sequence model, i.e., the RNN-T, E2E decoder 200.

In the example shown, the architecture of the neural corrector/denormer 300 is further adapted to the correction context by accounting for the fact that many of words in an input 115, written domain phrase, e.g., "wake me up at", are simply copied into the written domain output 120, e.g., "wake me up at," during correction. Specifically, the tagger RNN 320 is trained to am on the input sequence before the attention/decoder portion 330, by tagging the words in the input sequence of the intermediate transcription 115 as either "trivial" (e.g., not requiring correction), in which case the word can simply be copied to the output, written domain sequence of the written domain transcription 120, or "non-trivial" (e.g., requiring correction), in which case the word is passed into attention/decoder portion 330. In addition to performing correction, the written domain correction model 300 could also be used to re-rank an n-best list in a second-pass setting.

In some configurations, the encoder/tagger portion 303, 304 of the model 300, which runs for all input, contains about four (4) million parameters, while the attention/decoder portion 301 of the model 300, which runs only for text spans marked for correction, contains about six (6) million parameters. The small footprint of the neural correction model makes it attractive for the on-device context. The model is implemented in Tensorflow and is trained asynchronously on twelve graphics processing units (GPUs), with a batch size of sixteen. By contrast, the E2E, RNN-T decoder 200 of the ASR system includes about one-hundred fourteen (114) million parameters.

In one example, an input sequence $x=\{x_1, \ldots, x_I\}$ is mapped to an output, written domain sequence $y=\{y_1, \ldots, y_T\}$, where the sequence vocabulary is composed of words. For instance, output labels associated numbers "4" and "30" in the written domain sequence are represented as numerical words such that each number is spelled out as "four" and "thirty". The BiRNN encoder 310 is defined as follows:

$$h_i = [\vec{h}_i; \overleftarrow{h}_i]$$

$$\text{where } \vec{h}_i = RNN_\rightarrow(\vec{h}_{i-1}, x_i)$$

$$\text{and } \overleftarrow{h}_i = RNN_\leftarrow(\overleftarrow{h}_{i+1}, x_i)$$

where $h=h_1, \ldots, h_I$ are hidden encoder states.

The tagger RNN 320 is defined as $s_i=RNN_{tag}(s_{t-1}, t_{i-I}, h_i)$, where $s=s_i, \ldots, s_i$ are hidden tagger states, with corresponding observations, i.e., tag sequence $t=t_i, \ldots, t_1$. Each tag $t_i$ is a joined tag in the cross-product set of {trivial, non-trivial}×{start, continuation} to model whether a word is the beginning of a new segment needed to be corrected or a continuation of the previous segment. This refinement allows for the modeling of consecutive non-trivial segments. The learning objective of the tagger RNN 320 may be expressed by the following equation.

$$\operatorname*{argmax}_t \prod_{i=1}^{I} P(t_i \mid s_i) \quad (1)$$

Where P is defined as a linear projection of s followed by a softmax layer. Alignments for training the tagger RNN 320 may be obtained using a heuristic alignment technique that determines subsequences common to the input and output transcripts 115, 120. These common subsequences are marked as "trivial" (e.g., not requiting correction). For instance, common subsequences may generally include non-numerical words. In the example shown, the common subsequences marked/tagged as "trivial" by the tagger RNN 320 include the word sequence "Wake me up at". Here, since the phrase "Wake me up at" is in the written domain and does not require correction, the phrase can be copied over to the output to form part of the corrected, written domain transcription 120.

The written domain correction model 300 uses the results of the tagger RNN 320 to extract text snippets to be corrected, such as the numerical words "four" and "thirty" in the intermediate transcription 115 marked as non-trivial. For example, if a text snippet spans from time s to e, the input spans $\{x_s, \ldots, x_e\}$ along with the context hidden states and $\vec{h}_s$ and $\overleftarrow{h}_e$ become the input to the next stage attention model. The BiRNN encoder 310 is defined $RNN_{mid}$ over $\{x_s, \ldots, x_e\}$. Finally, the attention/decoder portion ($RNN_{dec}$) 330 is defined as $d_{i,t}=RNN_{dec}(d_{i,t-1}, c_{i,t})$, where $c_{i,t}$ is the result of the attention function of $d_{i,t-1}$, $\vec{h}_s$, $\overleftarrow{h}_e$ and $RNN_{mid}(\{x_s, \ldots, x_e\})$. The two-dimensional indices (i, t) indicate t is relative to a given position i (s, e) in the input sequence. The learning objective of the attention/decoder portion 330 may be expressed by the following equation.

$$\underset{y}{\mathrm{argmax}} \prod_{t=1}^{L(i)} P(y_{i,t} | d_{i,t}) \quad (2)$$

Accordingly, the results of the tagger RNN 320 enable the attention/decoder portion 330 of the neural corrector/denormer 300 to be applied to less than all of the text in the intermediate transcription 115, e.g. only to relevant spans of text, thereby improving accuracy and decreasing latency, cost, and computation expense. For instance, in the example shown, the relevant spans of text to be corrected (e.g., snippets to be corrected) include the numerical words "four" and "thirty", whereby the attention/decoder 330 corrects "four" and "thirty" to be "4:30" such that the numerical representation "4:30" now represents the numeric sequence in the final transcription 120. Notably, the model 300 is trained to also inject proper symbols/characters associated with the numeric sequence, such as currency symbols, a colon for time, etc. Here, the corrected portion "4:30" is appended to the copied over portion "Wake me up at" to provide the complete corrected, written domain final transcription 120.

During training of the neural corrector/denormer 300, the two learning objectives expressed in Equation (1) and Equation (2) translate to two cross-entropy losses that can be linearly combined. During inference (i.e., decoding time) of the neural corrector/denormer 300, the attention/decoder portion 330 and the tagger RNN 320 work as a pipeline such that the attention/decoder portion 330 is only used as required by tagger RNN 320, i.e., when the tagger RNN 320 tags words in the intermediate transcription 115 as "non-trivial" (e.g., not requiring correction).

Figure 4:
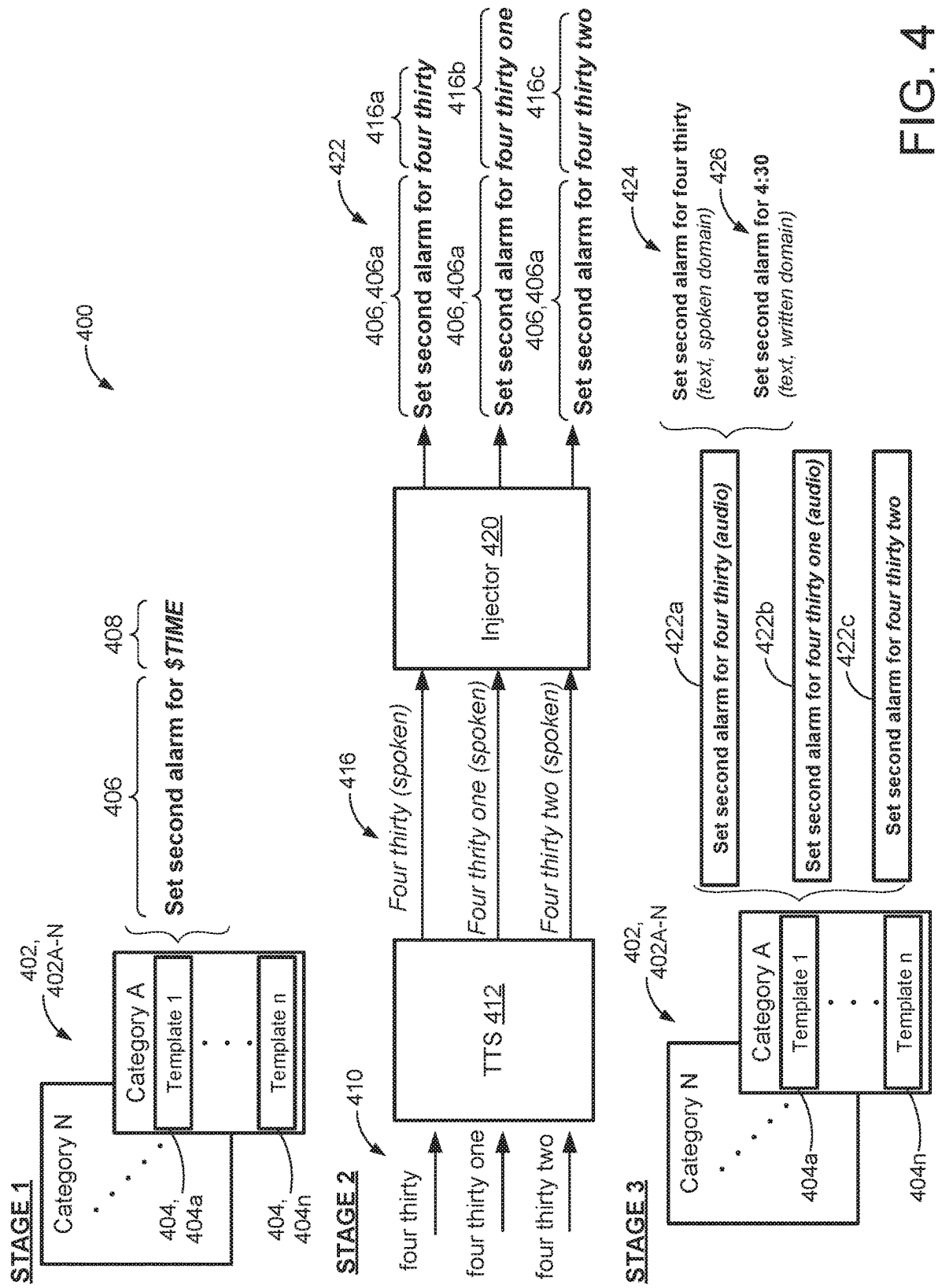
FIG. 4 is a schematic view of an example training process for training the neural corrector/denormer.

With reference to FIGS. 1 and 4, the enhanced ASR system 100 can improve E2E, speech recognition performance on numeric sequences by applying one or more of several enhancements. For example, synthetic training data 422 can be used to successfully address data sparsity issues, by using a TTS system 412 to synthesize additional training data 422 for written domain numeric sequences. In doing so, synthesized speech training data 422 can be generated for challenging categories of numeric sequences in order to improve model coverage of those categories.

The data sparsity or OOV issues can additionally or alternatively be addressed through the use of a neural correction network (e.g., neural corrector/denormer 300), which is trained on written-domain ground truth transcription/RNN-T written-domain hypothesis pairs 115, 424, and which can learns to correct mistakes. In other examples, the RNN-T, E2E decoder 200 is trained to output numeric sequences in the spoken domain, and to denorm back to the written domain. In various implementations, such an approach can be implemented using an FST-based denormer or a neural denormer that is based on a written-domain correction model.

As noted above, in some examples, the ARS system 100 benefits by augmenting the training data 402 using the TTS system 412 to synthesize additional training data 416, 422 for written domain numeric sequences, thereby addressing a "long tail" data sparsity issue of the RNN-T, E2E decoder 200. To address this "long tail," data sparsity issue, additional training data 416, 422 that represents challenging yet realistic numeric sequences can be generated. To this end, categories of numeric sequences that are frequently seen in logs, e.g., of digital assistant requests or of search engines, can be identified.

FIG. 4 shows an example process 400 for obtaining additional training data. 416, 422 for training the neural decoder/encoder 200 to learn to represent various categories of numeric sequences in the written domain. The remote computing device 201 (e.g., server) may execute the process 400 and train the models 200, 300 accordingly. At stage 1, the process 400 obtains a plurality of training utterance sets 402, 402A-N each associated with a different respective numeric category A-N and including a plurality of respective transcript templates 404, 404a-n. For instance, different respective numeric categories of numeric sequences may include, without limitation, a "Day" category, a "Percent" category, a "Postal Code" category, a "Time" category, or a "Year" category. Table 1 illustrates several such categories of numeric sequences including, specifically, categories that represent a variety of numeric ranges or sizes.

TABLE 1

| Sample TTS Utterance Categories, with Example Synthetic Numerics | | | |
|---|---|---|---|
| Category | Example Transcript Template | Example Numeric | Average Numeric Length |
| DAY | remind me on monday the $DAY | 31st | 1.8 |
| PERCENT | turn down sound to $PERCENT | 20.22% | 2.2 |
| POSTALCODE | how far away is $POSTALCODE | 86952 | 5.1 |
| TIME | set second alarm for $TIME p.m. | 10:46 | 3.0 |
| YEAR | play the top 40 from $YEAR | 1648 | 4.0 |

Stage 1 shows each transcript template 404 including a respective default phrase 406 in the written domain and a numeric slot 408. The respective default phrase 406 in each unique transcript template 404 may represent spoken voice samples, e.g., "(spoken) "set second alarm for . . . ," from anonymized non-synthetic utterances. In some examples, one or more transcript templates 404 may include a corresponding written default phrase 406 that is provided as input to the TTS system 412 for generating a synthetic speech representation of the default phrase 406. At stage 2, for each transcript template 404, the process 400 generates one or more synthetic speech representations 416 of numeric values (e.g., (spoken) "four thirty," (spoken) "four thirty one," (spoken) "four thirty two," etc.), and for each of the one or more synthetic speech representations 416 of numeric values generated, injects the corresponding synthetic speech representation 416 of numeric values into the slot 408 of the corresponding transcript template 404 to generate a unique training utterance 422. Here, the unique training utterance 422 includes an audible representation of the default phrase 406, e.g., (spoken) "set second alarm for . . . ", for the corresponding transcript template 404 and the corresponding synthetic speech representation 412, e.g., (spoken) "four thirty", of numerical values.

At stage 2, the process 400 may implement the TTS system 412 to generate each synthetic speech representation 416 of numeric values based on corresponding training numerical value input text 410. The TTS system 412 may include a multi-speaker TTS system that generates a mel-spectrogram that is conditioned on phonemes and an n-dimensional speaker embedding that is learned for each speaker during training. In some examples, n is equal to 256. Here, the predicted mel-spectrogram may then be inverted to a time-domain waveform with a WaveRNN neural vocoder. Multi-style training (MTR) may be used to add artificial noise to synthesized audio, TTS training data may include audio data derived from speakers of a single language or from multiple languages, or of speakers that share a single accent or have multiple different accents. During inference, input, textual numeric sequences are mapped to phonemes, and a speaker is randomly selected.

Moreover, at stage 2, the process 400 may implement an injector 420 that is configured to receive, as input, each synthetic speech representation 416 of numeric values output from the TTS system 412, and provide, as output, the unique training utterance 422 by injecting the synthetic speech representation 416 into the slot 408 associated with the default phrase 406. Such injection can occur by performing weighted sampling from a numeric WFST grammar which is weighted on the spoken domain. While the slot 408 is shown as following the default phrase 406 in the template 404, the slot 408 may precede the default phrase 406 or may be interspersed anywhere between the start and end of the default phrase 406.

In some examples, the audible representation of the default phrase 406 corresponding to at least one of the transcript templates 404 includes anonymized non-synthetic speech. Here, the utterances used to generate templates may be anonymized in one or more ways before they are generated, stored or used, so that personally identifiable information is removed. For example, a user's identity may be anonymized so that no personally identifiable information can be determined for the user, or a user's geographic location may be generalized where location information is obtained, e.g., such as to a city, ZIP code, or state level, so that a particular location of a user cannot be determined. The user may have control over how information is collected about him or her and used by the ASR system 100. In additional examples, the audible representation of the default phrase 406 corresponding to at least one of the transcript templates 404 includes a synthetized speech representation of the default phrase 406. For instance, the TTS system 412 may synthesize the respective default phrase 406 in one or more of the transcript templates 404.

At stage 3, the process 400 updates each respective transcript template 404 of the plurality of transcript templates 404 in each of the plurality of training utterance sets 402 representing a respective different category with the one or more respective unique training utterances 422 generated that each include the same default phrase 406 and a different synthetic speech representation 416 of numeric values. Furthermore, the process 400 may also generate, for each unique training utterance 422, parallel textual transcriptions 424, 426, one in the spoken domain, e.g. (text) "set second alarm for four thirty", and the other in the written domain, e.g., (text) "set second alarm for 4:30". This process 400 is repeated numerous times for each template 404, each time synthesizing a unique training utterance for that category of numeric sequence. In some examples, the written domain transcription 426 of the unique training utterance 422 includes a ground-truth transcription that is used in conjunction with recognition hypothesis 115 output from the decoder 200 for training neural corrector/denormer 300 of FIG. 3.

Referring back to FIG. 1, some other examples, the ASR system 100 benefits from spoken domain training and FST denorming. With this enhancement, the RNN-T, E2E decoder 200 is trained on a spoken domain version of the training set, and the translation back to written domain is left to an FST denormer derived from a legacy, production grammar. In order to train the RNN-T, E2E decoder, transcriptions of utterances in both the spoken domain and the written domain are used as training data. These examples can be obtained by passing written domain transcripts from a training set through an FST verbalizer, then choosing a single, spoken domain verbalization by passing each candidate hypothesis through a lexicon, and force-aligning the resulting phone sequences against the phones in the utterance. The spoken domain transcription that was obtained using the verbalization grammar is used as TTS training data.

In additional examples, the ASR system 100 benefits from the use of neural denorming. Specifically, since an FST-based denorming approach can be challenging to place on a device with limited resources, a neural denormer could also be used in place of an FST. For instance, the written domain neural correction model may be adapted to the spoken domain by rephrasing or recharacterizing, it as a neural denormer which consumes spoken domain training data and emits written domain output. The architecture of the neural denorming model is identical to the written correction model.

In testing, the ASR system 100 benefits over legacy systems by the introduction of synthesized training data, particularly for shorter numeric sequences, and that errors that plague rule-based FST denormers can be almost entirely mitigated. The avoidance of OOV issues obtained by training in the spoken domain appears to largely solve formatting problems experienced by written domain models, while using a neural denormer, which learns how to denorm from training data, sidesteps the denorming errors seen in the FST-based spoken domain model. Finally, the spoken domain denorming approach does not result in a significant degradation on the real-audio data sets. When multiple enhancements were used together, the improvements for E2E performance were greatest, particularly for longer utterances.

Figure 5:
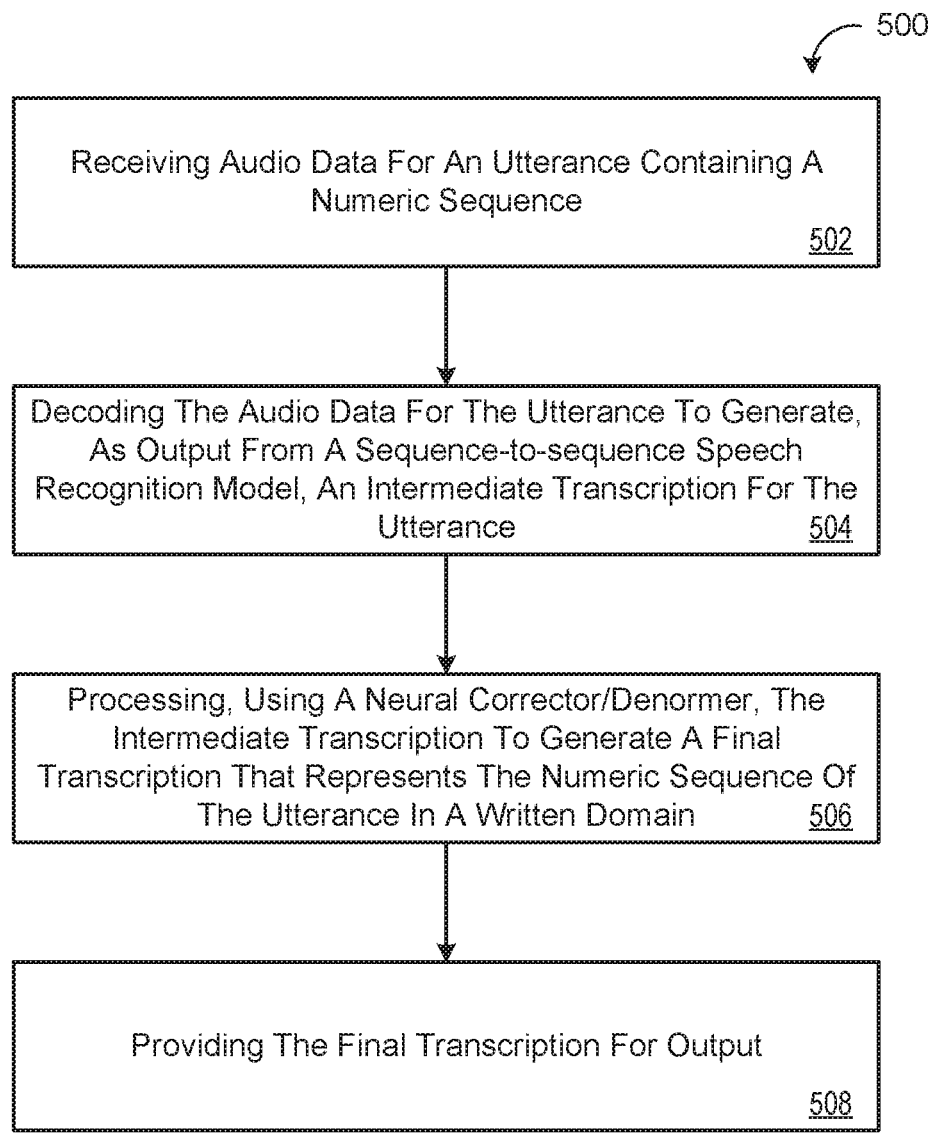
FIG. 5 is a flowchart of an example arrangement of operations for a method of generating final transcriptions that represent numerical sequences in a written domain

FIG. 5 provides a flowchart of an example arrangement of operations for a method 500 of generating final transcriptions 120 representing numerical sequences of utterances 106 in a written domain. Data processing hardware residing on the user device 102 or the remote server 201 may execute the operations for the method 500. At operation 502, the method 500 includes receiving, at the data processing hardware, audio data 110 for an utterance 106 containing a numeric sequence. At operation 504, the method 500 includes decoding, by the data processing hardware, using a sequence-to-sequence speech recognition model 200, the audio data 110 for the utterance 106 to generate, as output from the sequence-to-sequence speech recognition model 200, an intermediate transcription 115 of the utterance 106.

At operation 506, the method 500 also includes processing, by the data processing hardware, using a neural corrector/denormer 300, the intermediate transcription 115 output from the sequence-to-sequence speech recognition model 200 to generate a final transcription 120 that represents the numeric sequence of the utterance 106 in a written domain. The neural corrector/denormer 300 may be trained on a set of training samples 402, where each training sample 402 includes a speech recognition hypothesis 115 for a corresponding training utterance and a ground-truth transcription 426 of the corresponding training utterance. The ground-truth transcription 426 of the corresponding training utterance is in the written domain. At operation 508, the method 500 also includes providing, by the data processing hardware, the final transcription 120 representing the numeric sequence of the utterance 106 in the written domain for output A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaining applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 6:
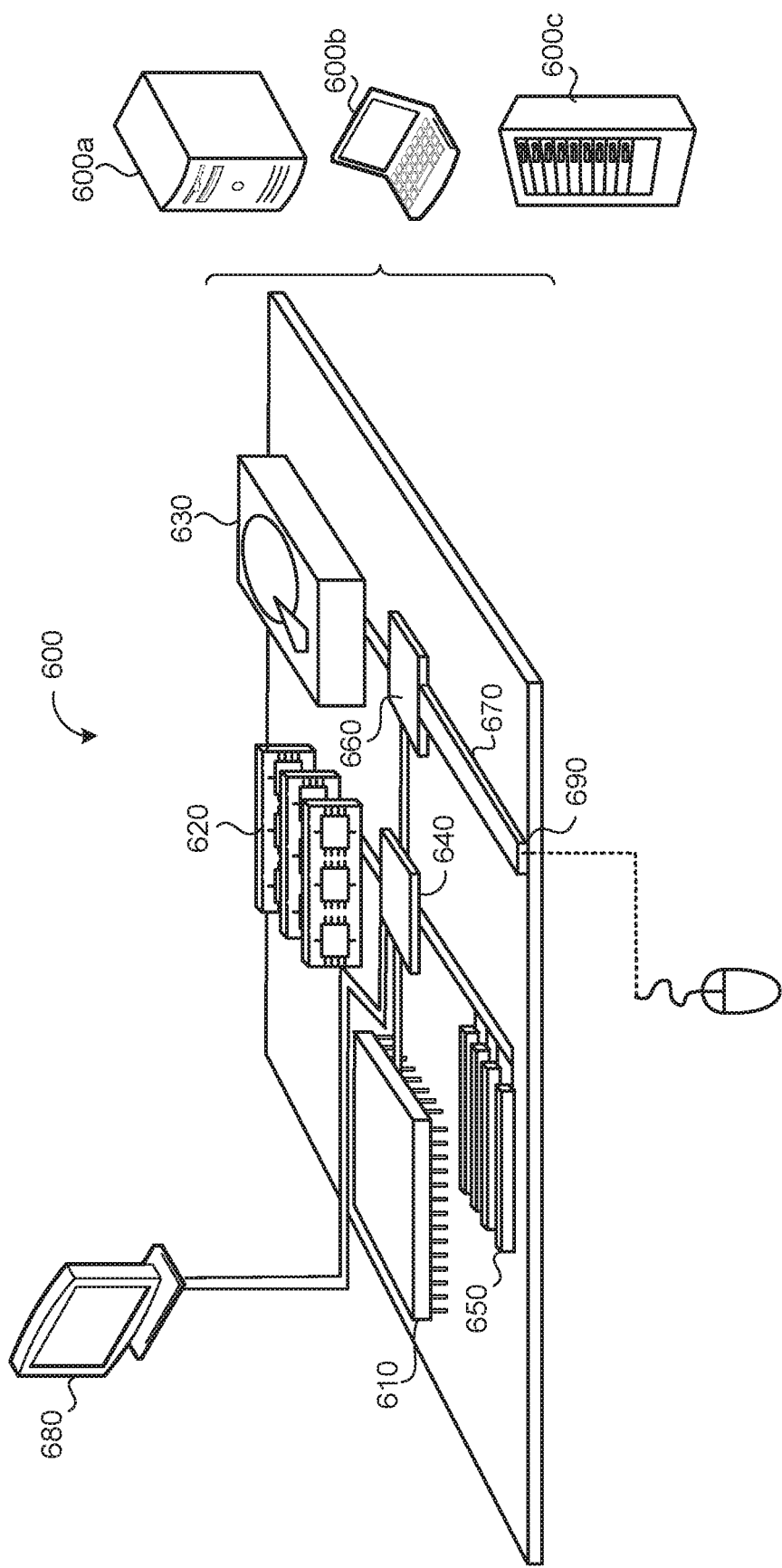
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM) electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600*a*, as a laptop computer 600*b*, or as part of a rack server system 600*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
   receiving, at data processing hardware, audio data for an utterance containing a numeric sequence;
   decoding, by the data processing hardware, using a sequence-to-sequence speech recognition model, the audio data for the utterance to generate, as output from the sequence-to-sequence speech recognition model, an intermediate transcription of the utterance;
   processing, by the data processing hardware, using a neural corrector/denormer, the intermediate transcription output from the sequence-to-sequence speech recognition model to generate a final transcription that represents the numeric sequence of the utterance in a written domain including numbers expressed as Arabic digits, the neural corrector/denormer trained on a set of training samples, each training sample comprising a speech recognition hypothesis for a corresponding training utterance and a ground-truth transcription of the corresponding training utterance, wherein the ground-truth transcription of the corresponding training utterance is in the written domain, and wherein the neural corrector/denormer comprises:
   an encoder portion configured to generate an encoded representation of the intermediate transcription output from the sequence-to-sequence speech recognition model;
   a tagger portion configured to tag each non-numerical word in the intermediate transcription as trivial and each numerical word in the intermediate transcription as non-trivial; and
   an attention/decoder portion configured to process non-trivial tags from the tagger portion to obtain a corresponding numerical representation that expresses the numeric sequence of the utterance as Arabic digits in the written domain; and
   providing, by the data processing hardware, the final transcription representing the numeric sequence of the utterance in the written domain for output.

2. The method of claim 1, wherein:
   the intermediate transcription output from the sequence-to-sequence speech recognition model is in a spoken domain including numbers expressed as numerical words; and
   the speech recognition hypothesis of each training sample in the set of training samples used to train the neural corrector/denormer is in the spoken domain.

3. The method of claim 2, wherein processing the intermediate transcription comprises using the neural corrector/denormer as a written domain denorming model configured to:

receive, as input, the intermediate transcription output from the sequence-to-sequence speech recognition model in the spoken domain; and generate, as output, the final transcription of the utterance in the written domain, the final transcription of the utterance in the written domain representing the sequence of numbers as the corresponding numerical representation that expresses the sequence of numbers as Arabic digits.

4. The method of claim 1, wherein:

the intermediate transcription output from the sequence-to-sequence speech recognition model is in the written domain and represents the sequence of numbers as numerical words; and the speech recognition hypothesis of each training example in the set of training samples used to train the neural corrector/denormer is in the written domain.

5. The method of claim 4, wherein processing the intermediate transcription comprises using the neural corrector/denormer as a written domain correction model configured to:

receive, as input, the intermediate transcription output from the sequence-to-sequence speech recognition model in the written domain; and generate, as output, the final transcription as a corrected transcription that replaces the numerical words in the intermediate transcription with the corresponding numerical representation that expresses the sequence of numbers as Arabic digits in the written domain.

6. The method of claim 5, wherein the written domain correction model is configured to generate, as output, the final transcription as the corrected transcription by only processing a first portion of the intermediate transcription that includes the numerical words without processing a remaining second portion of the intermediate transcription that includes non-numerical words.

7. The method of claim 6, wherein the written domain correction model is configured to copy over the non-numerical words from the intermediate transcription into the corrected transcription.

8. The method of claim 1, wherein the data processing hardware or a remote computing device in communication with the data processing hardware is configured to train the sequence-to-sequence speech recognition model and the neural corrector/denormer by:

obtaining a plurality of training utterance sets, each training utterance set associated with a different respective numeric category and comprising a plurality of respective transcript templates, each transcript template comprising a respective default phrase in the written domain and a numeric slot;

for each transcript template:
generating one or more synthetic speech representations of numeric values;
for each of the one or more synthetic speech representations of numeric values generated, injecting the corresponding synthetic speech representation of numeric values into the slot of the corresponding transcript template to generate a unique training utterance that comprises an audible representation of the default phrase for the corresponding transcript template and the corresponding synthetic speech representation of numerical values; and training the sequence-to-sequence speech recognition model on the unique training utterances generated for each of the one or more synthetic speech representations of numeric values generated for each of the plurality of transcript templates of each training utterance set.

9. The method of claim 8, wherein the audible representation of the default phrase corresponding to at least one of the transcript templates comprises anonymized non-synthetic speech.

10. The method of claim 8, wherein the audible representation of the default phrase corresponding to at least one of the transcript templates comprises a synthetized speech representation of the default phrase.

11. The method of claim 8, wherein a written domain transcription of the unique training utterance comprises the ground-truth transcription of a respective one of the training samples in the set of training samples used to train the neural corrector/denormer.

12. The method of claim 1, wherein the sequence-to-sequence speech recognition model comprises a recurrent neural network-transducer (RNN-T), end-to-end decoder model.

13. The method of claim 1, wherein:

the encoder portion comprises a bi-directional recurrent neural network (BiRNN);
the tagger portion comprises a recurrent neural network (RNN); and
the attention/decoder portion comprises a BiRNN.

14. A system comprising:

data processing hardware; and memory hardware in communication with the data processing hardware, the memory hardware storing instructions that when executed on the data processing hardware cause the data processing hardware to perform operations comprising:

receiving audio data for an utterance containing a numeric sequence;

decoding, using a sequence-to-sequence speech recognition model, the audio data for the utterance to generate, as output from the sequence-to-sequence speech recognition model, an intermediate transcription of the utterance;

processing, using a neural corrector/denormer, the intermediate transcription output from the sequence-to-sequence speech recognition model to generate a final transcription that represents the numeric sequence of the utterance in a written domain including numbers expressed as Arabic digits, the neural corrector/denormer trained on a set of training samples, each training sample comprising a speech recognition hypothesis for a corresponding training utterance and a ground-truth transcription of the corresponding training utterance, wherein the ground-truth transcription of the corresponding training utterance is in the written domain, and wherein the neural corrector/denormer comprises:

an encoder portion configured to generate an encoded representation of the intermediate transcription output from the sequence-to-sequence speech recognition model;

a tagger portion configured to tag each non-numerical word in the intermediate transcription as trivial and each numerical word in the intermediate transcription as non-trivial; and an attention/decoder portion configured to process non-trivial tags from the tagger portion to obtain a corresponding numerical representation that expresses the numeric sequence of the utterance as Arabic digits in the written domain; and providing the final transcription representing the numeric sequence of the utterance in the written domain for output.

15. The system of claim 14, wherein:
the intermediate transcription output from the sequence-to-sequence speech recognition model is in a spoken domain including numbers expressed as numerical words; and
the speech recognition hypothesis of each training sample in the set of training samples used to train the neural corrector/denormer is in the spoken domain.

16. The system of claim 15, wherein processing the intermediate transcription comprises using the neural corrector/denormer as a written domain denorming model configured to:
receive, as input, the intermediate transcription output from the sequence-to-sequence speech recognition model in the spoken domain; and
generate, as output, the final transcription of the utterance in the written domain, the final transcription of the utterance in the written domain representing the sequence of numbers as the corresponding numerical representation that expresses the sequence of numbers as Arabic digits.

17. The system of claim 14, wherein:
the intermediate transcription output from the sequence-to-sequence speech recognition model is in the written domain and represents the sequence of numbers as numerical words; and
the speech recognition hypothesis of each training example in the set of training samples used to train the neural corrector/denormer is in the written domain.

18. The system of claim 17, wherein processing the intermediate transcription comprises using the neural corrector/denormer as a written domain correction model configured to:
receive, as input, the intermediate transcription output from the sequence-to-sequence speech recognition model in the written domain; and
generate, as output, the final transcription as a corrected transcription that replaces the numerical words in the intermediate transcription with the corresponding numerical representation that expresses the sequence of numbers as Arabic digits in the written domain.

19. The system of claim 18, wherein the written domain correction model is configured to generate, as output, the final transcription as the corrected transcription by only processing a first portion of the intermediate transcription that includes the numerical words without processing a remaining second portion of the intermediate transcription that includes non-numerical words.

20. The system of claim 19, wherein the written domain correction model is configured to copy over the non-numerical words from the intermediate transcription into the corrected transcription.

21. The system of claim 14, wherein the data processing hardware or a remote computing device in communication with the data processing hardware is configured to train the sequence-to-sequence speech recognition model and the neural corrector/denormer by:
obtaining a plurality of training utterance sets, each training utterance set associated with a different respective numeric category and comprising a plurality of respective transcript templates, each transcript template comprising a respective default phrase in the written domain and a numeric slot;
for each transcript template:
generating one or more synthetic speech representations of numeric values;
for each of the one or more synthetic speech representations of numeric values generated, injecting the corresponding synthetic speech representation of numeric values into the slot of the corresponding transcript template to generate a unique training utterance that comprises an audible representation of the default phrase for the corresponding transcript template and the corresponding synthetic speech representation of numerical values; and
training the sequence-to-sequence speech recognition model on the unique training utterances generated for each of the one or more synthetic speech representations of numeric values generated for each of the plurality of transcript templates of each training utterance set.

22. The system of claim 21, wherein the audible representation of the default phrase corresponding to at least one of the transcript templates comprises anonymized non-synthetic speech.

23. The system of claim 21, wherein the audible representation of the default phrase corresponding to at least one of the transcript templates comprises a synthetized speech representation of the default phrase.

24. The system of claim 21, wherein a written domain transcription of the unique training utterance comprises the ground-truth transcription of a respective one of the training samples in the set of training samples used to train the neural corrector/denormer.

25. The system of claim 14, wherein the sequence-to-sequence speech recognition model comprises a recurrent neural network-transducer (RNN-T), end-to-end decoder model.

26. The system of claim 14, wherein:
the encoder portion comprises a bi-directional recurrent neural network (BiRNN);
the tagger portion comprises a recurrent neural network (RNN); and
the attention/decoder portion comprises a BiRNN.

* * * * *